Figure 1:
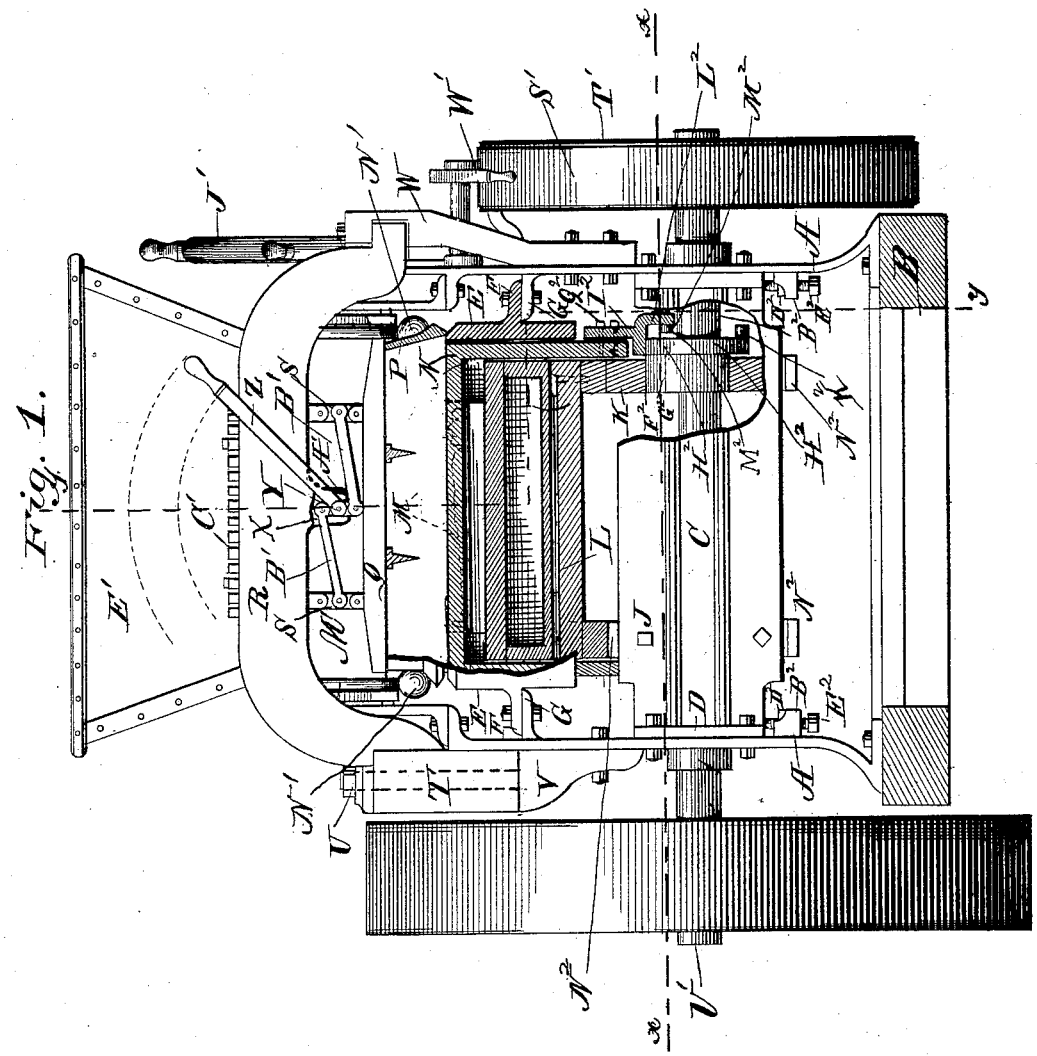

(No Model.)　　　　　　　　　　　　　　　　5 Sheets—Sheet 1.
W. AIKIN.
SAND MOLDING MACHINE.

No. 318,341.　　　　　　　　　Patented May 19, 1885.

Witnesses:
Saml. H. Lighton
John M. Fisher.

Inventor:
Wm. Aikin
by Louis Bagger & Co.
Attorneys.

(No Model.)  5 Sheets—Sheet 2.
W. AIKIN.
SAND MOLDING MACHINE.
No. 318,341. Patented May 19, 1885.
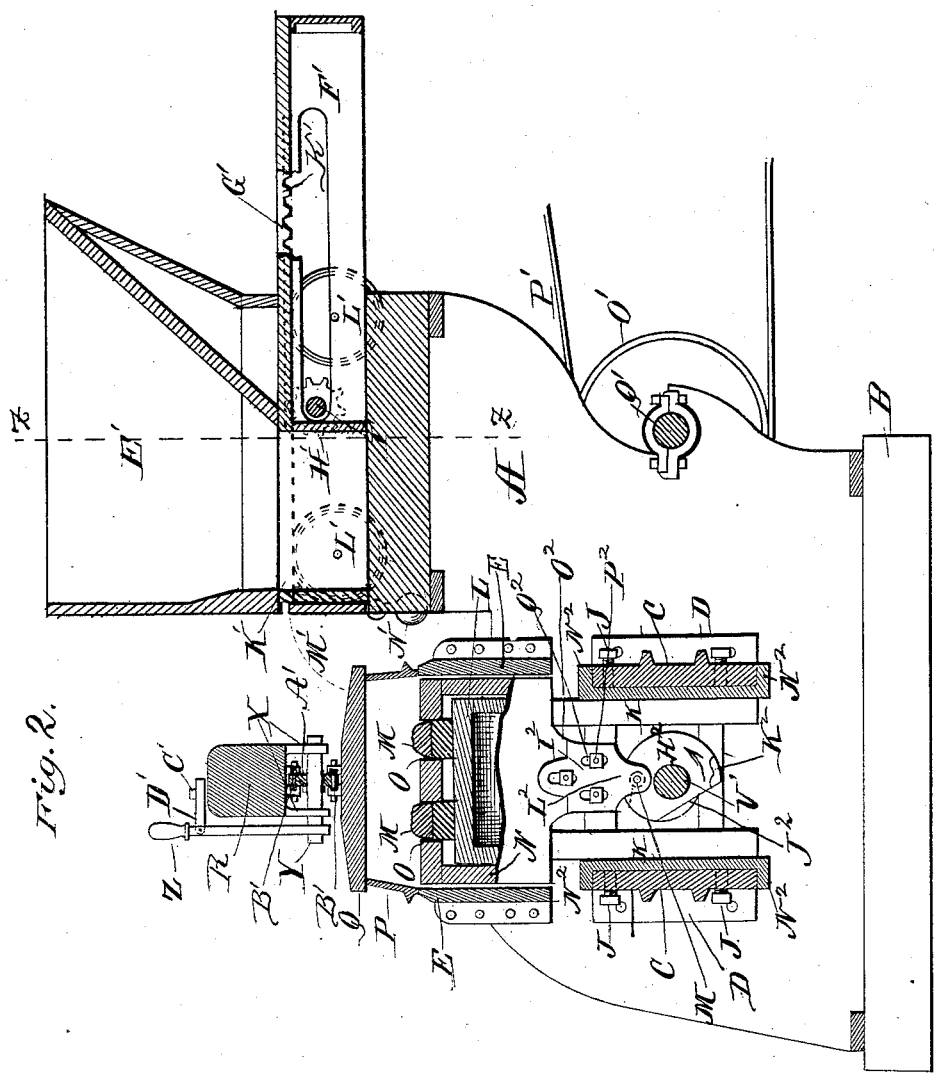
Witnesses:
Saml. H. Lighton
John M. Fisher
Inventor:
Wm. Aikin
By Louis Bagger & Co.
Attorneys (No Model.) 5 Sheets—Sheet 3.
W. AIKIN.
SAND MOLDING MACHINE.
No. 318,341. Patented May 19, 1885.
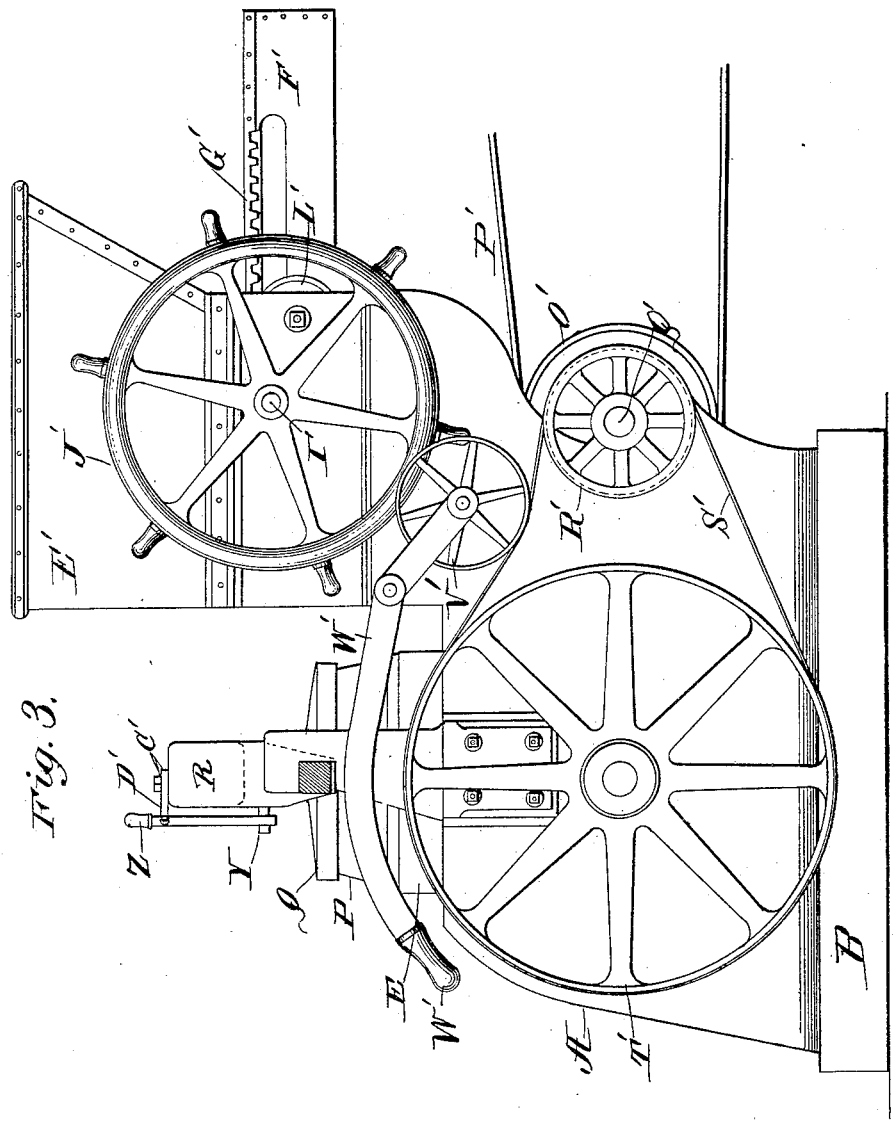
Witnesses:
Saml. H. Lighton
John W. Fisher
Inventor:
Wm. Aikin
By Louis Bagger & Co.
Attorney (No Model.) 5 Sheets—Sheet 4.
W. AIKIN.
SAND MOLDING MACHINE.
No. 318,341. Patented May 19, 1885.
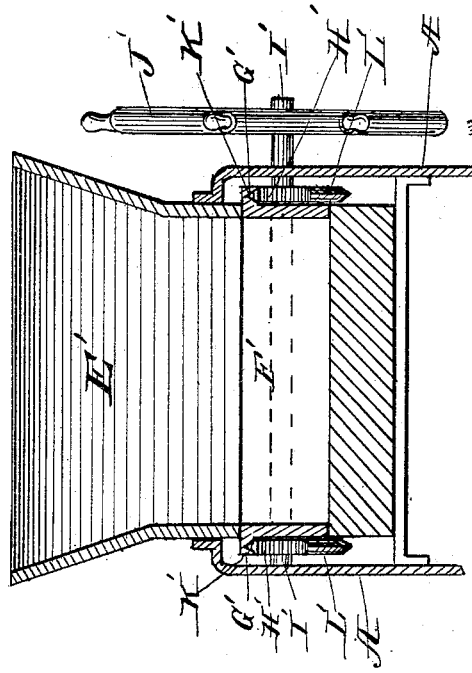
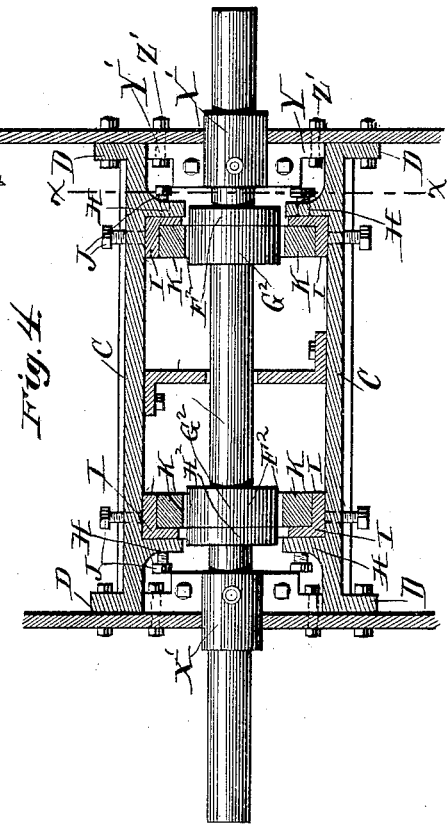
Witnesses:
Saml. H. Lighton
John M. Fisher
Inventor:
Wm Aikin
By Louis Bagger & Co.
attorneys.

(No Model.) 5 Sheets—Sheet 5.
W. AIKIN.
SAND MOLDING MACHINE.
No. 318,341. Patented May 19, 1885.
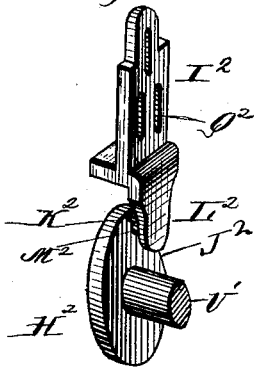
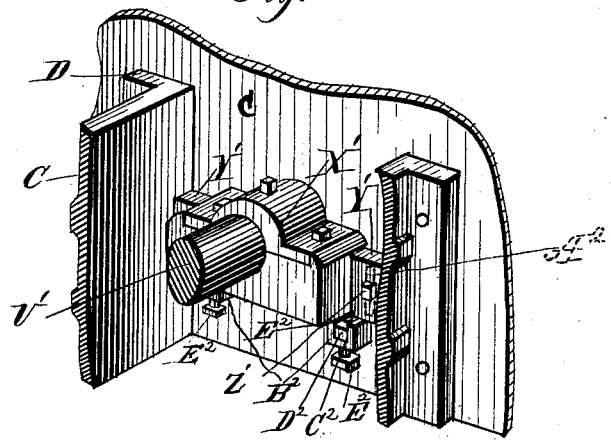
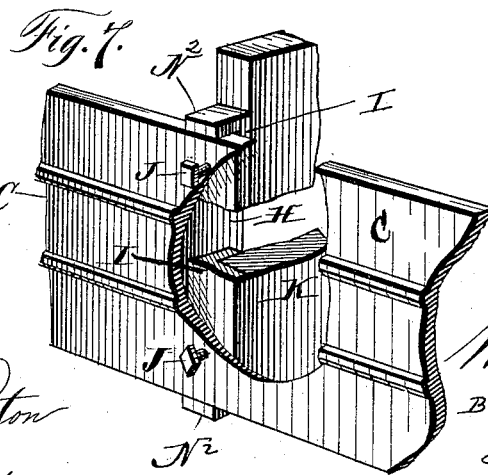

UNITED STATES PATENT OFFICE.

WILLIAM AIKIN, OF LOUISVILLE, KENTUCKY.

SAND-MOLDING MACHINE.

SPECIFICATION forming part of Letters Patent No. 318,341, dated May 19, 1885.

Application filed September 1, 1884. (No model.)

*To all whom it may concern:*

Be it known that I, WILLIAM AIKIN, a citizen of the United States, residing in Louisville, in the county of Jefferson and State of Kentucky, have invented certain new and useful Improvements in Sand-Molding Machines; and I do hereby declare that the following is a full, clear, and exact description of the invention, which will enable others skilled in the art to which it appertains to make and use the same, reference being had to the accompanying drawings, which form a part of this specification, and in which—

Figure 1 is a front view of my improved sand-molding machine with portions of the frame broken away, and showing the plunger and follower in vertical section. Fig. 2 is a longitudinal vertical section of the same on line $y$ $y$, Fig. 1. Fig. 3 is a side view. Fig. 4 is a horizontal section on line $x$ $x$, Fig. 1. Fig. 5 is a perspective detail view of the cam which operates the follower, and of the follower-foot; and Figs. 6 and 7 are respectively detail views of one of the bearings for the cam-shaft and of its surroundings and of the adjustable ways for the plunger-feet, and Fig. 8 is a vertical cross-sectional view of the sand-hopper and sand-drawer, taken on line $z$ $z$, Fig. 2.

Similar letters of reference indicate corresponding parts in all the figures.

My invention has relation to that class of sand-molding machines in which the pattern-bearing plunger is raised so as to press the patterns through corresponding apertures in the follower-plate, which compresses the sand in the flask, whereupon the plunger and patterns are first withdrawn and thereupon the follower, and it contemplates certain improvements upon the machines for which Letters Patent were granted to me and to W. W. Drummond jointly—viz., 195,070, 195,071, 195,784, 195,785, 195,786, 201,377, 202,322, 224,570, and 291,124; and it consists to that end in the improved construction and combinations of parts of such a machine, as hereinafter more fully described and claimed.

In the accompanying drawings, the letters A A indicate the sides of the frame of the machine. These sides are secured upon a suitable base, B, and are connected near the base by two transverse vertical plates, C C, secured by their flanged ends D to the inner sides of these sides of the frame, and are connected above the plates C C by a rectangular casing, E, open at its top and bottom, and resting with two flanges or ears, F F, at its ends upon flanges or ears G, projecting from the inner sides of the side pieces of the frame, the said ears F and G being connected by means of suitable bolts. The transverse plates C are provided near their ends with inwardly-projecting flanges H, and vertical rectangular ways I are placed in the corners formed by the plates and their flanges, the said ways bearing against the ends of set-screws J, passing through threaded apertures in the plates and in the flanges, and serving to adjust the said ways. The feet K of the plunger L slide between these ways, and the upper portion of the plunger travels vertically within the casing E, and has the patterns M secured upon its platen M'.

N is the follower, the upper portion of which forms a casing in which the plunger L slides, while its top is provided with apertures O, corresponding in location and size and shape to the patterns upon the plunger, which patterns may pass up through these apertures in the follower and expose exactly so much of the pattern as is to be molded in the sand. The flask P is placed with its edges resting upon the upper edges of the casing E, and the top of the flask is closed by a binder-plate, Q, which rests upon the upper edges of the flask and is supported from a horizontally-swinging yoke, R, by means of toggle-levers S, pivoted to the upper side of the binder-plate and to the under side of the yoke, as shown in Figs. 1 and 2. One end of the yoke is formed into a vertical sleeve or box, T, which fits and turns upon a vertical pintle, U, projecting upward from a shoulder, V, upon one side of the machine-frame, and the other end of the yoke is engaged by a forwardly-projecting hook, W, upon the other side of the machine-frame when the yoke and plate are swung into position over the top of the flask. Two lips, X X, project downward from the front and rear edges of the middle of the yoke, and a shaft, Y, having a hand-lever, Z, at its forward end is pivoted in perforations in these lips, and is provided upon its middle with a lever, A', to the ends of which two connecting-rods, B', are hinged, which rods are hinged at their outer ends to the central joint of the toggle-arms in such a manner that the toggle-arms will be straightened, and consequently the binder-plate forced down when the hand-lever is tilted to one side while the toggle-arms will be bent, and consequently the binder-plate raised when the hand-lever is tilted toward the middle of the yoke. A cogged rack, C', is secured to the upper side of the yoke and is engaged by a rearwardly-projecting pin or bolt, D', projecting from the lever, by means of which rack and bolt the lever may be held firmly in its desired positions.

E' is the sand-hopper, which is supported upon the top of the machine-frame to the rear of the flask, and the sand-drawer F' slides below the open lower end of the hopper, and is provided with cogged racks G' at both sides which are engaged by pinions H', secured upon a shaft, I', which passes through the longitudinally-slotted rear portions of the sides of the sand-drawer, and which is journaled in suitable bearings below the sand-hopper and provided with a hand-wheel, J', by means of which it may be revolved. The cogged racks G' are grooved longitudinally at K', forming ways K', which travel upon the edges of disks L', suitably journaled at both sides of the sand-drawer. A sand bridge or flap, M', is pivoted at its lower edge to swing forward at the forward end of the opening through which the sand-drawer slides, and it is provided at both ends with a weighted counterpoise, N', which projects beyond the pivotal line, forcing the flap to resume a vertical position when the sand-drawer is slid in, while the bridge or flap is tilted forward by the sliding drawer so as to rest with its free edge upon the rear edge of the flask when the drawer is slid forward, thus serving to prevent the sand from dropping out of the open bottom of the sand-drawer until it has reached the flask.

O' is a band-pulley, (see Fig. 3,) over which the belt P' passes, which conveys the power to the machine, and this band-pulley is secured upon a shaft, Q', upon the other end of which a band-pulley, R', is secured, and a belt, S', passes loosely over this pulley and over a pulley, T', upon a cam-shaft, U', so as to allow the said pulley R' to slip within the belt when the belt is loose, while an idler or tension pulley, V', is journaled at the end of a hand-lever, W', pivoted upon the side of the machine-frame, and may be forced by means of the said hand-lever against the belt in such a manner that it will tighten the belt and cause the pulley upon the cam-shaft to be revolved. The cam-shaft is journaled in bearings X', which are provided with laterally-projecting perforated ears Y', through which pass nutted bolts Z', sliding adjustably in vertical slots $A^2$ in the sides of the machine-frame, and the said sides of the frame have inwardly-projecting lips or lugs $B^2$, one at each side of the shaft, the upper sides of which lugs are formed with recesses $C^2$, corresponding in shape to nuts $D^2$, which fit in these recesses, and through which nuts pass set-screws $E^2$, the upper ends of which screws bear against the under side of the bearings, serving to adjust the said bearings vertically, while the nutted bolts in the sides of the frame support the bearings and prevent them from tilting inward. The plunger-feet K have apertures $F^2$, in which eccentric cams $G^2$ revolve, vertically reciprocating the plunger, the said cams being secured upon the cam-shaft, and two cams, $H^2$, are secured upon the cam-shaft outside of the eccentrics and serve to reciprocate the follower, having the feet $I^2$ of the follower riding upon them. The cams $H^2$ have a circular shape for more than one-half of their periphery, and are of the same diameter as the cams $G^2$, and the remaining portions of the cams are cut away to form a low portion, $J^2$, while the portion of the cam immediately preceding the cut-away portion and diametrically opposite to the swelled portion of cams $G^2$ is provided with a laterally-projecting lip, $K^2$, of a wedge shape upon the outer side of the cam. The follower-feet $I^2$ have downwardly-projecting lips $L^2$, which project upon the outsides of the cams $H^2$, and these lips are provided with inwardly-projecting lugs $M^2$, which may be engaged once in each revolution of the cam-shaft by the wedge-shaped lips $K^2$, the inclined inner edges of the said lips forcing the lugs $M^2$ down, and thus starting the follower on its descent, the feet traveling upon the cut-away portions of the cams.

When the machine is to be started for operation, the yoke and binder-plate are swung forward away from the top of the flask. The sand-drawer is now drawn forward by means of the hand-wheel and the pinion and rack, when the said drawer will tilt the sand-bridge forward and transport the sand from the hopper to the flask. The sand-drawer is now run back under the hopper and the yoke and binder-plate swung over the flask, where the binder-plate is forced down by means of the hand-lever and toggle-arms, which are locked in place by the bolt upon the hand-lever engaging the cogged rack upon the yoke. The hand-lever carrying the idler is now tilted, so as to cause the idler to tighten the belt, and the cam-shaft and its pulley will be rotated. This shaft has in the meantime, while the flask was filled, been standing with the follower and plunger feet resting upon the lowest portions of their respective cams, and when the cam-shaft is started the cams $H^2$ will force the follower upward, so as to compress the sand, and at the same time the plunger will be raised by the cams $G^2$, and again withdrawn by them after the patterns have been projected through the apertures in the follower-plate, and have made their impression in the sand already compressed by the follower-plate. The perforated follower-plate will remain in its raised position some time after the patterns are withdrawn by the plunger, so as to prevent the sand from following the patterns, and to clear the patterns from the sand, whereupon the follower is withdrawn by the wedge-shaped lips engaging the lugs upon the follower-feet, when the yoke and binder-plate may be swung out, the flask removed, and the same operation repeated. The ends of the flanges of the rectangular ways I, which rest against the transverse plates C, are formed with lips $N^2$, which bear against the upper and lower edges of the transverse plates C, keeping the said ways in position, while the ways may be adjusted by means of the set-screws J, so as to take up any wear in the ways or follower-feet. The bearings for the cam-shaft may be adjusted so as to bring the follower-plate level with the lower edges of the flask when the said plate is in its highest position by means of the set-screws and. by means of the screws secured adjustably in the slots in the sides of the machine-frame. The follower-feet $I^2$ are secured to the lower ends of the legs $O^2$ by means of screws $P^2$, which slide in slots $Q^2$ in the said feet, and may be adjusted by means of these screws, so that, by adjusting the bearings of the cam-shaft and by adjusting the follower-feet, the plate of the follower may be adjusted to its desired position.

Having thus described my invention, I claim and desire to secure by Letters Patent of the United States—

1. In a sand-molding machine, the combination, with the flask and frame supporting the flasks, of a yoke pivoted at one end to swing in a horizontal plane, and having means for retaining its other end when swung over the flask, a binder-plate fitting over the open top of the flask, toggle-arms pivoted to the under side of the yoke and to the top of the binder-plate, connecting-rods hinged to the middle joints of the toggle-arms, a shaft pivoted in lips under the middle of the yoke, and having a lever upon its middle, to the ends of which the connecting-rods are hinged, a hand-lever secured to the outer end of the shaft, and having a rearwardly-projecting bolt, and a cogged rack upon the upper side of the yoke engaging the bolt upon the hand-lever, as and for the purpose shown and set forth.

2. In a sand-molding machine, the combination, with the flask and frame supporting the flask, of a sand-hopper and a sand-drawer open at top and bottom and reciprocating under the open lower end of the hopper, and a flap or bridge pivoted at its lower edge to the forward edge of the recess, in which the sand-drawer reciprocates, and having counterpoises at its ends forcing the flap into its vertical position when the drawer is withdrawn from the flask, the free edge of the flap resting upon the rear edge of the flask when tilted forward by the drawer, as and for the purpose shown and set forth.

3. In a sand-molding machine, the combination, with the frame of the machine, and the sand-hopper supported at the top of the same, of a sand-drawer reciprocating under the open lower end of the hopper, having longitudinal slots in the rear portions of its sides, having grooved ways or flanges at the upper edges of its sides, and having a cogged rack at one side, disks journaled at the sides of the frame, and having the grooved ways traveling upon them, and a shaft journaled in bearings in the frame, passing through the slots in the sides of the drawer, having a pinion meshing with the rack, and provided with a hand-wheel at one end, as and for the purpose shown and set forth.

4. In a sand-molding machine, the combination of the plunger carrying the patterns, and having feet sliding vertically in bearings, the follower having apertures in its plate for the passage of the patterns, and having feet provided with downwardly-projecting lips, having inwardly-projecting lugs at their lower ends, and a cam-shaft having eccentric cams formed with a swell to one side bearing against the plunger-feet, and having cams formed with swells corresponding in shape to the swells of the aforesaid cams, formed with swells diametrically opposite to the said swells, formed with cut-away portions subsequent to the last-named swells, and having outwardly-projecting wedge-shaped lips upon their outer sides engaging the lugs upon the follower-feet, as and for the purpose shown and set forth.

5. The combination of the cam-shaft operating the plunger and follower with the machine-frame, having the lips $B^2$, formed with recesses $C^2$, the nuts $D^2$, fitting in the recesses, the set-screws $E^2$, fitting in the nuts, and the boxes or bearings for the cam-shaft supported upon the ends of the set-screws, as and for the purpose shown and set forth.

6. The combination, with the plunger-feet, of the side pieces of the machine-frame, the vertical plates C C, secured with their ends between the side pieces of the frame, the rectangular ways I, having the lips $N^2$ at the upper ends of the flanges, of the ways resting against the plates C, and the set-screws J, bearing against the sides of the ways, as and for the purpose shown and set forth.

7. The combination, with the cam-shaft operating the plunger and follower, of the machine-frame having the lips $B^2$, formed with the recesses $C^2$, and with the vertical slots $A^2$, the bearings or boxes for the cam-shaft having the perforated ears Y', the nutted bolts Z', sliding adjustably in the slots, and fitting in the ears of the bearings, the nuts $D^2$, fitting in the recesses $C^2$, and the set-screws $E^2$, fitting in the nuts and bearing against the under sides of the bearings, as and for the purpose shown and set forth.

WM. AIKIN.

Witnesses:
SAML. H. LIGHTON,
JOS. B. WALKER.